United States Patent Office 3,513,661
Patented May 26, 1970

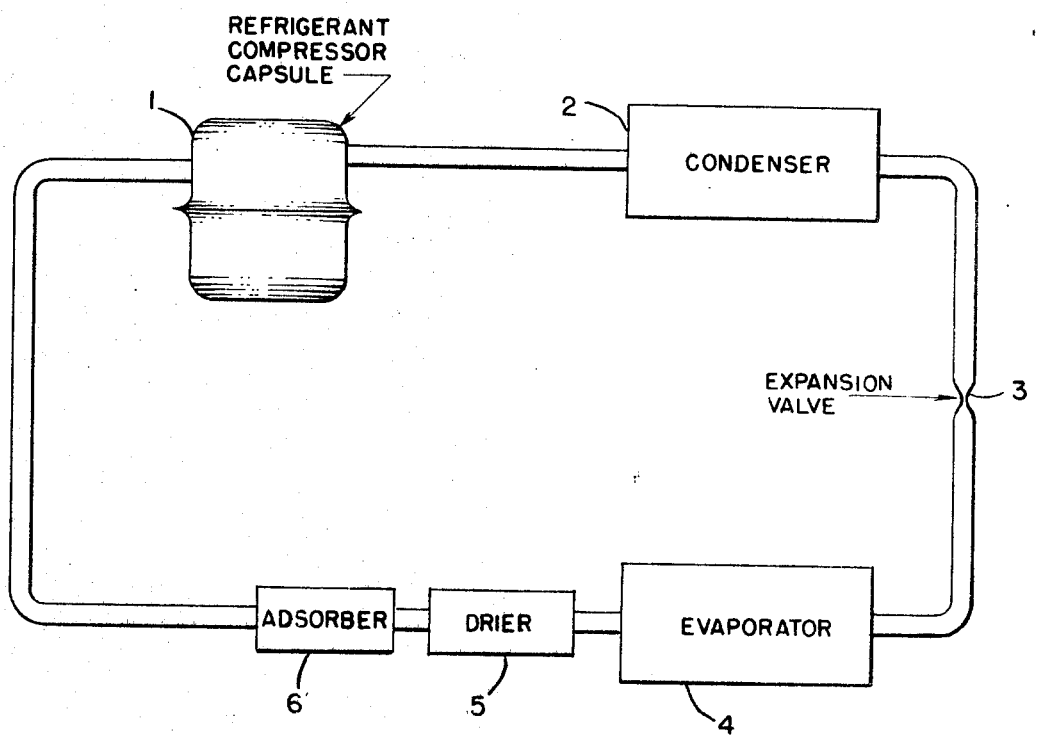

3,513,661
DESICCANT-CONTROL OF REFRIGERANT COMPRESSOR HEAD PRESSURE
Erik Frede Christiansen, Sonderborg, Denmark, assignor to Danfoss A/S, Nordborg, Denmark, a Danish company
Continuation-in-part of abandoned application Ser. No. 581,077, Sept. 1, 1966. This application Sept. 9, 1968, Ser. No. 767,029
Int. Cl. F25b 47/00
U.S. Cl. 62—85        15 Claims

ABSTRACT OF THE DISCLOSURE

A method for avoiding excessive gaseous pressures in the compressor and condenser of a hermetically sealed refrigerating system having a chlorinated hydrocarbon gaseous refrigerant subject to decomposition to form non-condensable gaseous decomposition products when the system is operated over an extended period of time. The refrigerant when primarily in a gaseous state in the system is contacted with an absorbent to remove non-condensable gaseous decomposition products from the refrigerant in sufficient quantities to preclude excessive pressures from developing in the system.

---

This is continuation-in-part application of my application Ser. No. 581,077 filed Sept. 1, 1966, now abandoned.

This invention relates generally to refrigeration and more particularly to an improvement in refrigeration plants adapted to circulate a refrigerant which tends to decompose to form at least one gaseous decomposition product.

Conventional refrigeration plants incorporate a circuit including a compressor, a condenser and an evaporator through which a refrigerant is circulated. Frequently, a portion of the refrigerant undergoes decomposition or cracking whereby various gaseous decomposition or cracked gas products are formed. Thus, for example, in a typical refrigeration plant the refrigerant is a fluorinated hydrocarbon or "Freon" such as dichlorodifluoromethane some of which, during the course of operation of the refrigeration plant, decomposes into such gaseous decomposition products as carbon dioxide, carbon monoxide, nitrogen, oxygen, methane, ethane, monochlorodifluoromethane and ammonia. It is thought that the decomposition of the refrigerant is due to the occurrence in the refrigeration plant of contact of the refrigerant with materials of the refrigeration plant such as the insulation of the motor particularly at elevated temperatures.

The generation of gaseous decomposition products of the refrigerant in a refrigeration plant is highly detrimental, particularly when the gaseous decomposition products are not condensable. Non-condensable gaseous decomposition products collect as gas bubbles in the condenser and thereby reduce the effective heat-transfer surface of the condenser. Accordingly, to produce a given amount of cooling more power must be provided to the refrigeration plant. However, this measure contributes to the decomposition of the refrigerant and the resultant continual inefficient operation of the refrigeration plant substantially reduces its life. Moreover, the formation of non-condensable gaseous products causes condenser and compressor head pressures to rise. This will place a heavier burden on the electric motor which will increase the temperature within a hermetically sealed capsule within which the compressor operates. The increase in temperature will increase and further decomposition of the refrigerant and will eventually result in a shortened life of the refrigeration unit or plant.

It has been attempted to prevent the production of gaseous decomposition products of refrigerants in refrigeration plants by attempting to select combinations of refrigerants with materials of construction of the refrigeration plants which would not result in decomposition of the refrigerant. However, these efforts have been of relatively little success.

It will, of course, be appreciated that the problem of the formation of gaseous decomposition products of the refrigerant is particularly critical in hermetically sealed refrigeration plants due to the fact that they are not intended to be opened during their lifetime and, thus, there is no opportunity to replace partially decomposed refrigerant with fresh refrigerant.

It is a principal object of the present invention to provide a method of preventing excessive head pressures and condenser pressure by use of a desiccant in a refrigerant plant and adsorbent of non-condensable gaseous products to thereby increase the operating life of such a plant.

According to the present invention, the above described problem is overcome by the provision of an improvement in refrigeration plants comprising means for contacting the refrigerant with an adsorbent for at least one undesirable gaseous decomposition product formed by the refrigerant in the refrigeration plant to remove the decomposition product from the refrigerant. Materials generally recognized as adsorbents may be used in the present invention and are exemplified by zeolites, active carbon, aluminum oxide, calcium chloride, calcium oxide, calcium sulfate and phosphorous pentoxide. Conveniently, the means for contacting the refrigerant with the adsorbent may be a vessel containing the adsorbent and including means for passage of the refrigerant therethrough such as an inlet conduit and an outlet conduit.

It is known to incorporate in the refrigerant circuit of a refrigeration plant, a drier for removing moisture (water) from the refrigerant. However, though such a drier may contain a material that is used as an adsorbent, in the present invention it cannot be said to constitute means for removing gaseous decomposition products from the refrigerant. In the first place, the water is not a decomposition product of the refrigerant but rather is moisture already present in the refrigerant at the time of the filling of the refrigeration plant and which could not be eliminated by the usual pre-drying methods. Furthermore, it was heretofore desired only to remove the moisture from the refrigerent in order to prevent the ceasing of operation of the refrigeration plant due to the formation of ice at the expansion valve with which refrigeration plants are conventionally provided and, accordingly, there was usually provided the exact quantity of adsorbent necessary to reach an equilibrium with all of the water. The adsorbent employed was a zeolite having a pore size of 3 to 4 angstroms, approximating the size of water molecules.

In the present invention, there is employed a conventional adsorbent, such as one or more of those enumerated above, preferably a zeolite, having a pore size of about 3 to 10 angstroms in a quantity sufficient to adsorb one or more undesired gaseous decomposition products from the refrigerant.

The gaseous decomposition product generally produced in the greatest quantity is carbon dioxide. To adsorb the carbon dioxide according to the present invention there may be used an adsorbent, preferably a zeolite, of a pore size of about 5 to 10 angstroms. A suitable zeolite having a pore size of 5 angstroms is Union Carbide "Molecular Sieve Type 5A" and a suitable zeolite having a pore size of 10 angstroms is Union Carbide "Molecular Sieve Type 13X." Adsorbents of such pore size are further useful according to the present invention in that they adsorb carbon monixide and monochlorodifluoromethane as well as carbon dioxide.

In accordance with the invention, an adsorbent, preferably zeolite, of a pore size of about 3 angstroms, such as the zeolite of Union Carbide designated "Molecular Sieve Type 3A," is employed to remove nitrogen and oxygen from the refrigerant. While fluorinated hydrocarbons contain neither nitrogen nor oxygen atoms and, accordingly, do not directly form gaseous nitrogen and oxygen upon decomposition, these gases nevertheless do occur with the decomposition of the fluorinated hydrocarbons and, therefore, may conveniently be characterized as being "formed" by this decomposition. The same may be said of ammonia.

There may also be employed according to the present invention absorbents of a pore size of about 4 angstroms, such as the zeolite designated by Union Carbide as "Molecular Sieve Type 4A." This is useful for the absorption of methane, ethane and ammonia from the refrigerant.

Furthermore, in accordance with the invention, there may be employed several different adsorbents in order to effect the adsorption of a larger number of gaseous decomposition products. Thus, for example, there may be employed a mixture of zeolite of 3, 4 and 5 angstrom pore sizes respectively.

In accordance with another aspect of the invention, there may be employed in the same refrigeration plant a drier for the removal of water according to known practice and a gaseous decomposition product adsorber as herein described. However, it is particularly convenient to employ the same means both for drying the refrigerant and for removing gaseous decomposition products. According to a specific embodiment, there may be employed a co-adsorbent, i.e., an adsorbent capable of adsorbing molecules of different sizes; thus, for the co-adsorption of carbon dioxide and water according to the present invention there may be employed a zeolite having a pore size of about 5 angstroms, such as Union Carbide "Molecular Sieve Type 5A."

In another specific embodiment of the invention, a zeolite having a pore size of about 3 to 4 angstroms is used to remove both water and carbon dioxide. As pointed out above, it was known to use such a zeolite simply to remove water. However, according to the present invention, there is used a quantity of zeolite in excess of that required to establish an equilibrium with all of the water. Preferably, the amount of zeolite employed is at least double that required to establish an equilibrium with all of the water.

Other features and advantages of the method in accordance with the present invention will be better understood as described in the following specification and appended claims in conjunction with the single drawing illustrating an improved refrigeration plant according to the method of the present invention.

A motor-driven compressor is hermetically sealed in a capsule 1. Gaseous refrigerant such as "Freon" is compressed in the compressor and delievered through a conduit therefrom to a condenser 2 where it is cooled and liquified. From the condenser 2 a conduit for the refrigerant runs to the evaporator 4. Between the condenser 2 and the evaporator 4 there is provided in the conduit an expansion valve 3 for expanding the liquified refrigerant. Downstream of the evaporator 4 there is provided an adsorbent-containing drier 5 and downstream of the drier 5 is provided an adsorbent-containing gaseous decomposition product adsorber 6 which, conveniently, constitutes a tank provided with an inlet and an outlet for passage of the gaseous decomposition product-containing refrigerant therethrough.

Although the presence of gaseous decomposition products in the condenser is generally more detrimental than in other parts of the refrigeration plant, it is preferred that the adsorption means according to the present invention be disposed at the intake side of the compressor rather than at the outlet side thereof. The known adsorbents are more effective at the lower temperatures occurring at the intake side of the compressor.

The tank 6 contains a molecular sieve for absorbing the decomposition products. The molecular sieve is intended to preclude excessive rise in the head pressure of the compressor and the condenser. Moreover, it has been found that the cooling capacity of a hermetic unit for domestic use falls 10% if the content of $CO_2$ is 5% so that the removal of $CO_2$ is necessary to keep the cooling ability of the system and maintain proper pressure. In domestic refrigeration the refrigerant capacity is in the order of 2,000 ml. or two (2) liters. By using two grams of dessicant or adsorber about 0.2 gram of $CO_2$ in such a system are adsorbed. This will generally be sufficient where in such a system the motor insulation has a polyester base so that $CO_2$ is not formed inordinately.

In refrigeration systems of the same capacity of refrigerant set forth above if Formvar insulation is used more $CO_2$ will be higher, for example in the order of two (2) grams and thus about twenty (20) grams of adsorber should be used.

The molecular sieve materials are as described above and other absorption agents such as calcium chloride $CaCl_2$, aluminum oxide $Al_2O_3$, calcium oxide $CaO$, calcium sulfite $CaSO_4$, phosphorous pentoxide $P_2O_5$ may be used. The refrigerant in the unit may be $F_{12}$ which is dichlorodifluoromethane and $F_{22}$ which is monochlorodifluoromethane. Co-adsorption agents having a pore size of 5 angstrom used are such materials as aluminum and calcium zeolites.

The invention is not to be construed as limited to the particular embodiments disclosed herein since these are to be regarded as illustrative rather than restrictive.

What I claim and desire to be secured by Letters Patent is:

1. A method for precluding excessive gaseous pressures in a compressor and condenser of a hermetically sealed refrigerating system having a chlorinated hydrocarbon gaseous refrigerant compressed in a compressor and converted to a liquid in a condenser and expanded in an expansion valve for effecting cooling in an evaporator, said refrigerant being subject to decomposition to form non-condensable gaseous decomposition products when said refrigerating system is operated over an extended period of time, said method comprising circulating said refrigerant in said system, and while circulating said refrigerant contacting the refrigerant when primarily in a gaseous state with an adsorbent to remove said non-condensable gaseous decomposition products from said refrigerant in sufficient quantities to preclude excessive pressures from developing in said system.

2. A method according to claim 1, in which said adsorbent comprises a desiccant capable of adsorbing moisture in said refrigerant.

3. In the method according to claim 1 in which the refrigerant also contains water, the adsorbent comprisign an adsorbent adsorptive of water as well as of said decomposition product and being present in a quantity in excess of that required to reach an equilibrium with all of said water.

4. The method according to claim 1, in which the adsorbent is selected from the group consisting of zeolites, active carbon, aluminum oxide, calcium chloride, calcium oxide, calcium sulfate and phosphorous pentoxide.

5. The method according to claim 1, in which the refrigerant is dichlorodiffuoromethane.

6. The method according to claim 5, in which the decomposition product is selected from the group consisting of carbon dioxide, carbon monoxide, nitrogen, oxygen, methane, ethane and monochlorodifluoromethane.

7. The method according to claim 1, in which the adsorbent has a pore size of about 3 to10 angstroms.

8. The method according to claim 3, in which the adsorbent is a zeolite having a pore size of about 3 to 5 angstroms.

9. The method according to claim 7, in which the adsorbent comprises at least one zeolite.

10. The method according to claim 7, in which the decomposition product comprises carbon dioxide, and the adsorbent being a zeolite.

11. The method according to claim 9, in which the decomposition product comprises a gas selected from the group consisting of nitrogen and oxygen, and said zeolite having a pore size of about 3 angstroms.

12. The method according to claim 9 in which the decomposition product comprises a gas selected from the group consisting of methane, ethane and ammonia, and said zeolite having a pore size of about 4 angstroms.

13. The method according to claim 9, in which decomposition product comprises a gas selected from the group consisting of carbon dioxide, carbon monoxide and monochlorodifluoromethane, and said zeolite having a pore size of about 5 to 10 angstroms.

14. A method according to claim 1, in which said contacting of said refrigerant with said adsorbent is immediately upstream of said compressor on a suction side thereof.

15. A method for removing gaseous decomposition products from a chlorinated hydrocarbon refrigerant in a hermetically sealed refrigerating system, said refrigerant being subject to decomposition to form non-condensable gaseous decomposition products when said refrigerating system is operated over an extended period of time, comprising, providing a said refrigerant, compressing the refrigerant in a gaseous state, cooling the compressed refrigerant to liquify it, expanding said liquified refrigerant to render it gaseous, and subsequent to expanding and before recompressing said refrigerant contacting the refrigerant with an adsorbent to remove said non-condensable gaseous products from said refrigerant sufficiently to maintain the pressure of the compressed refrigerant and entrained gaseous decomposition products from exceeding a desired pressure range during compression thereof and during cooling of said refrigerant to liquify it.

References Cited
UNITED STATES PATENTS

| | | | |
|---|---|---|---|
| 2,341,429 | 2/1944 | Elsey | 62—85 X |
| 3,175,342 | 3/1965 | Balogh | 62—85 X |
| 3,205,679 | 9/1965 | Geist et al. | 62—474 |
| 3,407,617 | 10/1968 | Wischmeyer et al. | 62—85 |

WILLIAM E. WAYNER, Primary Examiner